United States Patent [19]

Thirion

[11] 4,413,491
[45] Nov. 8, 1983

[54] ANTI-THEFT DEVICE FOR THE STEERING COLUMN OF AN AUTOMOBILE

[75] Inventor: André Thirion, Dijon, France

[73] Assignee: Antivols Simplex, Apollinaire, France

[21] Appl. No.: 262,907

[22] Filed: May 12, 1981

[30] Foreign Application Priority Data

Jun. 6, 1980 [FR] France .................. 80 12562

[51] Int. Cl.³ .................. B60R 25/02; G05G 5/06
[52] U.S. Cl. .................. 70/252; 70/185; 70/DIG. 70; 70/DIG. 42; 74/527
[58] Field of Search .................. 70/DIG. 70, 252, 185, 70/186, 184, 211; 192/29

[56] References Cited

U.S. PATENT DOCUMENTS

| | | | |
|---|---|---|---|
| 153,415 | 7/1874 | Winn | 70/DIG. 70 |
| 1,150,999 | 8/1915 | Corley | 70/211 |
| 1,250,127 | 12/1917 | Beers | 70/DIG. 70 |
| 1,375,044 | 4/1921 | Follick | 70/185 |
| 1,428,450 | 9/1922 | Romeiser et al. | 70/252 |
| 1,762,921 | 6/1930 | Fairchild | 70/252 |
| 2,761,304 | 9/1956 | Hepler | 70/211 X |
| 2,854,111 | 9/1958 | Simonsen | 192/29 X |
| 3,075,403 | 1/1963 | Hepner | 74/527 X |
| 3,500,976 | 3/1970 | Halley | 192/29 |
| 3,723,682 | 3/1973 | Pecott | 70/184 X |
| 4,333,325 | 6/1982 | Morikawa et al. | 70/252 X |

FOREIGN PATENT DOCUMENTS

| | | | |
|---|---|---|---|
| 627507 | 4/1936 | Fed. Rep. of Germany | 70/185 |
| 978553 | 11/1950 | France | 192/29 |
| 448175 | 5/1949 | Italy | 70/252 |
| 4400 | 9/1919 | Netherlands | 70/185 |
| 162002 | 4/1921 | United Kingdom | 70/185 |
| 331326 | 7/1930 | United Kingdom | 70/211 |

*Primary Examiner*—Cornelius J. Husar
*Assistant Examiner*—Carl F. Pietruska
*Attorney, Agent, or Firm*—Holman & Stern

[57] ABSTRACT

An anti-theft device for locking the steering of an automobile vehicle comprises a crown gear (3) which is rotatable with the steering shaft (1) and has teeth (8) separated by concave sections having a part-circular profile (9), and a locking element on a spindle positioned parallel to the steering shaft (1) and rotatable by a lock (17), the locking element comprising a finger (10) having a length substantially equal to the radius of the concave sections (9) of the crown gear (3) and an outer part-circular face (14) of the same radius as the concave sections (9). The face of the locking finger engages a concave section to prevent rotation of the crown gear and steering shaft in the locked position and the finger is completely out of engagement with the concave sections and gear teeth to allow rotation of the crown gear and steering shaft when in the unlocked position.

3 Claims, 4 Drawing Figures

ANTI-THEFT DEVICE FOR THE STEERING COLUMN OF AN AUTOMOBILE

BACKGROUND OF THE INVENTION

1. Field of the Invention

The present invention relates to anti-theft devices used in automobiles in order to lock the steering.

2. Description of the Prior Art

Known anti-theft devices in general comprise a locking bolt actuated by a lock, which bolt may occupy two positions, i.e. an unlocked position in which the bolt is removed from the steering shaft and a locked position in which the bolt is located in a slot of a ring fixedly mounted on the steering shaft, which shaft is locked in this way. The bolt also occupies a third, intermediate, position in which it is supported on the periphery of the ring under the action of a spring. It is only when the end of the bolt is brought opposite the slot of the ring, as a result of rotation of the steering wheel, that the bolt extends into the slot under the action of the spring and locks the steering.

Tens of millions of these anti-theft devices for steering columns have been manufactured throughout the world and are mostly satisfactory from the point of view of security in operation. However, they have various drawbacks in use such as difficulty in unlocking the steering. Locking takes place, as mentioned above, by rotating the steering wheel in order to bring the bolt opposite the slot of the ring. When this has taken place, the bolt extends into the slot whilst the user continues to rotate the steering wheel until it locks. This then leads to a certain amount of wedging of the bolt in the slot which is further aggravated if the steering wheels abut against an obstacle (pavement, stone etc.). Unlocking therefore requires a considerable effort on the steering wheel before it is possible to actuate the unlocking key.

BRIEF SUMMARY OF THE INVENTION

The object of the present invention is to enable unlocking of the steering to be effected without any effort on the steering wheel, whilst retaining and improving the safety characteristics and the ease of use of the anti-theft device.

This object is achieved, in accordance with the present invention, by means of an anti-theft device for the steering column of an automobile, comprising a crown gear rotatable with the steering shaft, the teeth of the crown gear being separated by hollow sections of part-circular profile, and a locking element positioned parallel to the steering shaft, and rotatable under the action of a lock, said locking element comprising a finger having a length substantially equal to the radius of the hollow sections of the crown gear and an outer part-circular end face of the same radius as that of the hollow sections.

The engagement of the part-circular end face of the locking finger with a hollow part-circular section of the crown gear causes irreversible locking of the steering column as any couple applied to the steering column produces a radial reaction on the finger. In contrast, rotation of the finger to release the steering column does not, in practice, require any effort.

In a preferred embodiment, the particular end face of the locking finger is positioned adjacent a face having an involuted part-circular section in such a way that whatever the relative position of the finger and the crown gear at the moment of locking, locking is effectively carried out. If the part-circular end face is positioned opposite a hollow section of the crown gear, the finger extends without effort into the hollow section and causes locking. In all other cases, the face having an involuted part-circular section acts on the crown gear and causes locking as soon as the slightest couple is applied to the steering column.

In a particularly advantageous embodiment of the invention, the crown gear is mounted on the steering shaft with a predetermined rotational clearance and is resiliently urged into a median position. By means of this arrangement, if the face having an involuted part-circular section is acting on the crown gear, the crown gear rotates against the resilient urging action and the finger then occupies its locking position.

In order to satisfy the safety conditions which require that locking of the steering may only be effected by a deliberate action of the driver, such as the extraction of the lock key, the invention provides a variant in which the locking finger is fixedly mounted on a spindle operatively connected to the lock by connection means which only rotate the spindle and finger after a deliberate action by the user.

BRIEF DESCRIPTION OF THE DRAWINGS

In the accompanying drawings:

FIG. 4 is a cross-sectional view of another embodiment of the locking finger of the invention.

DETAILED DESCRIPTION

The steering arrangement of the vehicle comprises a steering shaft 1 rotatably mounted in a steering column 2 fixed to the vehicle.

Figure 1:
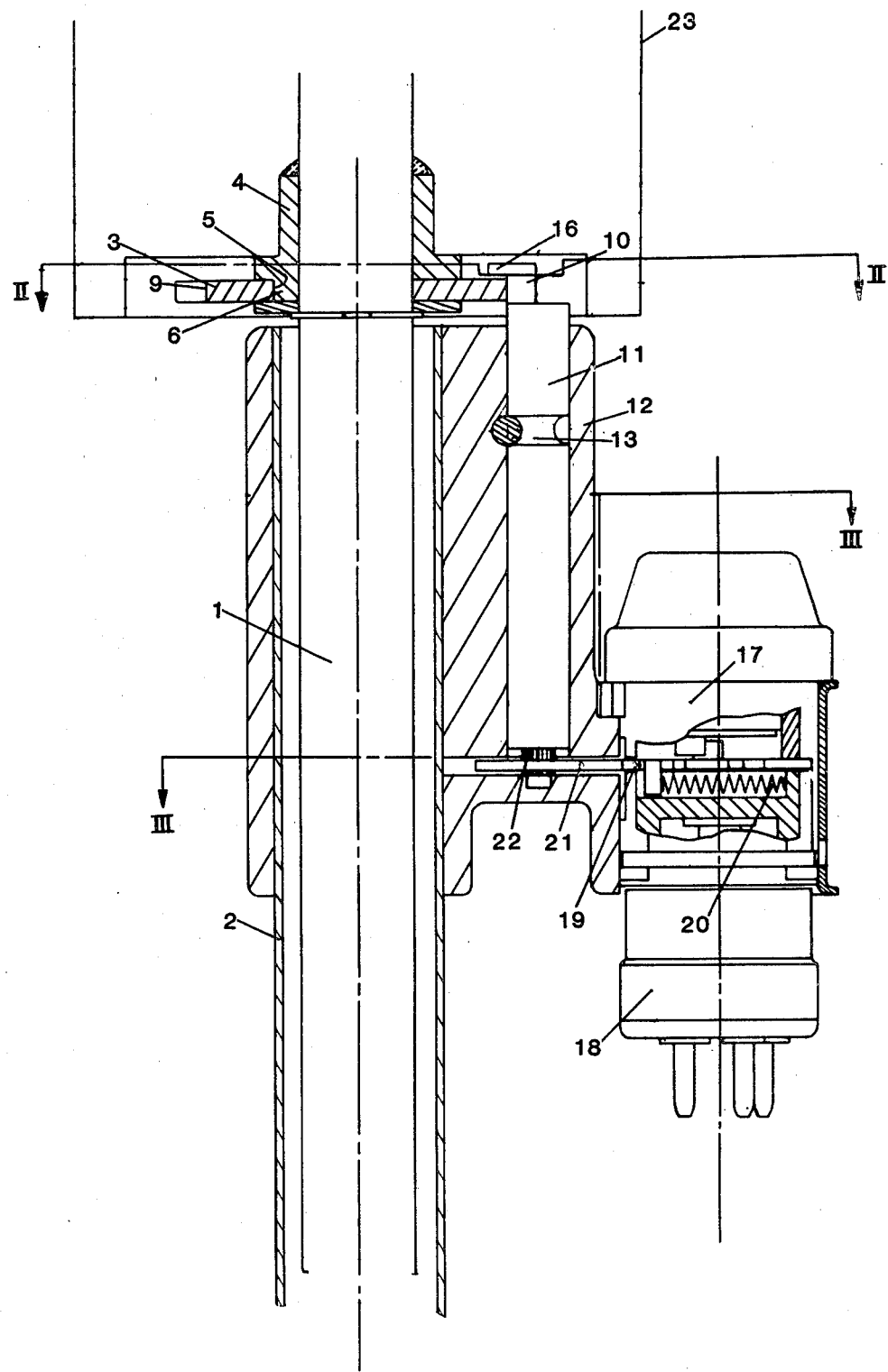
FIG. 1 is a diagrammatic cross-sectional, partly elevational view partly in axial, taken generally along line I—I of FIG. 2, of a steering column provided with an anti-theft device according to the present invention.
Figure 2:
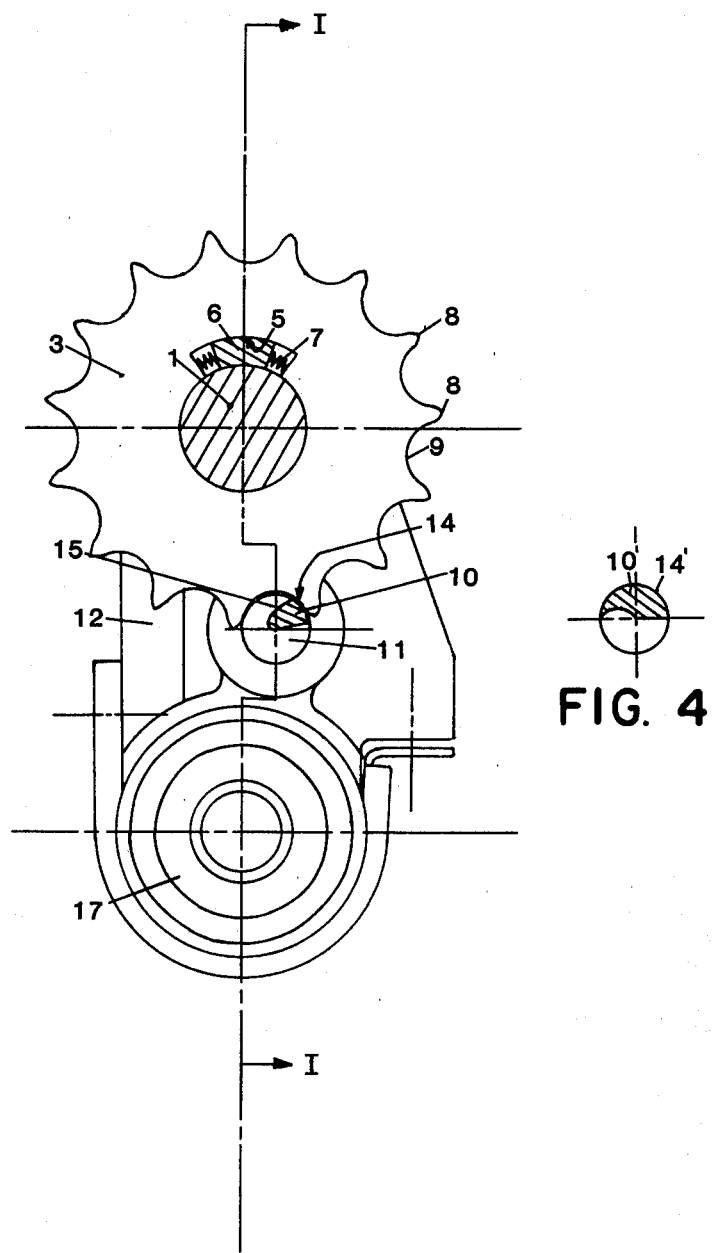
FIG. 2 is a cross-sectional view taken along the line II—II of FIG. 1 with certain elements omitted for clarity.
Figure 3:
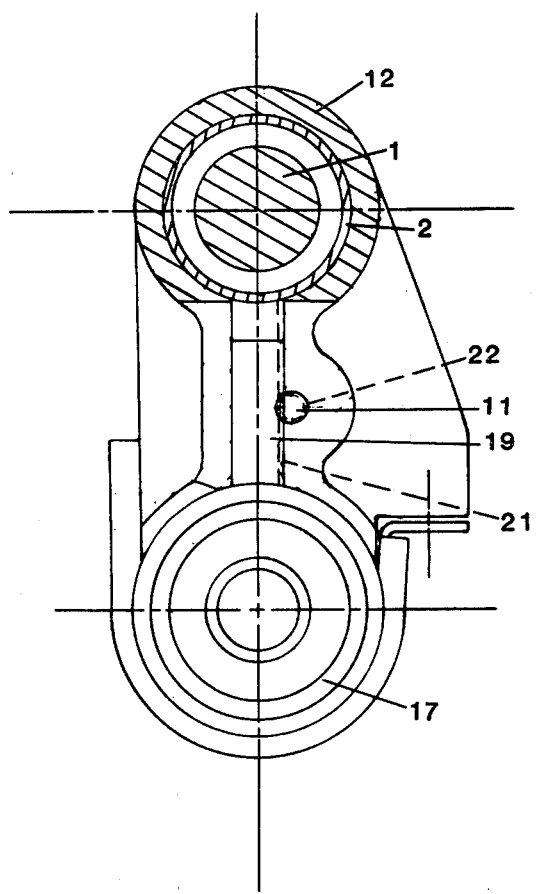
FIG. 3 is a cross-sectional view taken along the line III—III of FIG. 1.

A crown gear 3 is mounted on the shaft 1 by means of a screwed sleeve 4 and has a central arcuate aperture 5 (FIG. 2) housing a radial projection 6 of the sleeve 4 which provides a clearance in rotation of the crown gear relative to the sleeve 4 and, therefore, to the steering shaft 1. Compression springs 7 are housed in the aperture 5 on both sides of the projection 6 in such a way as to resiliently urge the crown gear 3 to a median position as shown in FIG. 2. The teeth 8 of the crown gear 3 are separated by hollow sections 9 of part-circular profile. A radially positioned locking finger 10 is fixedly mounted on a spindle 11 positioned parallel to the steering shaft 1. The spindle 11 is rotatably mounted in a housing 12 rigid with the steering column 2 and is axially located therein by a pin 13. The finger 10 has a radius substantially equal to that of the hollow sections 9 and is provided, on its outer end, with a part-circular crown gear engaging face 14 of the same radius as that of the hollow section 9, the face 14 being adjacent a face 15 having an involuted part-circular section. The finger 10 may be capped by a projection 16 (shown only in FIG. 1) which extends over the crown gear 3 in order to prevent the latter's removal by sliding on the steering shaft 1.

The housing 12 also supports a lock 17 the rotation of which controls, in a conventional manner, an electrical switch. The rotation of the lock 17 causes movement of a control element 19 urged by a spring 20 and having a rack 21 which is in engagement with teeth 22 provided at the end of the spindle 11 remote from the locking finger 10. The movement of the control element 19 under the action of the spring 20, after rotation of the lock 17 is only possible, in a known manner, by means of a deliberate action of the driver, for example the extraction of the lock key. This movement of the control element 19 causes rotation of the spindle 11 and of the finger 10 which is rigid with it. As mentioned above, whatever the relative position of the finger 10 and the crown gear 3 irreversible locking of the steering shaft is produced. The rotation of the lock 17 in the opposite direction causes the withdrawal of the control element 19 against the action of the spring 20 and therefore the rotation of the spindle 11 and the finger 10 which is removed from the crown gear 3 and so releases the steering shaft 1. A component 23 rigid with the sleeve 4 prevents access to the anti-theft system after removal of the steering wheel (not shown).

In the example described, the locking element may be controlled in a more direct manner, for example by a lever whose other end is subjected to the direct action of the lock key. In the same way, the locking finger 10 may be controlled by an electrical motor, acting for example on the spindle 11.

FIG. 4 shows another embodiment of the locking finger 10 wherein it is shaped to provide a larger cross-sectional size for increasing the strength thereof and a larger gear engaging face 14'. In this embodiment no involute face 15 is needed, but a retaining projection 16 may be provided on the end of finger 10 if desired.

I claim:

1. An anti-theft device for locking the steering shaft of a vehicle against rotation wherein the steering shaft extends colinearly through a hollow steering column and is mounted for relative rotation with respect thereto comprising, a crown gear mounted on said steering shaft by a mounting means so that it is rotatable with said steering shaft with respect to said steering column and rotatable with respect to said steering shaft through a predetermined arc, said crown gear comprising radially projecting teeth and concave sections between said teeth each having at least a partly circular profile, means to resiliently urge said crown gear into a median position within said predetermined arc, a locking element support member rigidly attached to said steering column, an elongated cylindrical locking spindle rotatably mounted in said support member with its longitudinal axis of rotation extending substantially parallel to said steering shaft, a control element operably engaging said spindle to impart and control the rotation thereof, a lock mounted on said support member operably engaging said control means to control the operation thereof, and a locking element on said spindle adjacent said crown-gear comprising a locking finger in the form of a segment of a cylinder rotatable with said spindle having a radially outer part circular face of substantially the same radius as said partly circular profile of said concave sections of said crown gear, said outer face being positioned with respect to said crown gear so that when said lock is in the unlocked position, said face and segment are entirely removed from engagement with said concave sections and teeth to allow rotation of said crown gear and when said lock is in the locked position, said face of said segment engages said partly circular profile of one of said concave sections to thereby prevent rotation of said crown gear and steering shaft.

2. An anti-theft device as claimed in claim 1, wherein said locking finger further comprises a second face having an involute partly circular profile extending from said outer face substantially toward the axis of rotation of said locking finger.

3. An anti-theft device as claimed in claim 1, wherein said crown gear mounting means comprises a sleeve member fixedly mounted on said shaft, a radial projection on said sleeve member, said crown gear being rotatably mounted on said sleeve member and having an arcuate slot slidably receiving said radial projection to allow a predetermined limited travel of said projection therein, and spring members interposed between said projection and the ends of said arcuate slot to resiliently urge said projection into a median position in said slot, and wherein said locking finger is positioned on one end of said spindle as an extension thereof, said spindle has the same radius as said outer face, a radial projection is provided on said finger to overlap said crown gear in the locked position to axially retain said crown gear on said sleeve member, a gear element is provided coaxially on the other end of said spindle, and said control element comprises an elongated member connected at one end to said lock to be reciprocably oscillated longitudinally thereby when said lock is operated between the locking and unlocking positions, a slot in said support member in which said elongated member is slidably received, and a gear rack on said elongated member operatively engaging said gear element to rotate said spindle and locking finger between said locking and unlocking positions.

* * * * *